INVENTOR.
JOHN W. GRAY
BY
ATTORNEY

United States Patent Office 2,855,590
Patented Oct. 7, 1958

2,855,590

DOPPLER SYSTEM FOR SPEED AND DRIFT MEASUREMENTS

John W. Gray, Pleasantville, N. Y., assignor to General Precision Laboratory Incorporated, a corporation of New York Application February 7, 1955, Serial No. 486,435

15 Claims. (Cl. 343—8)

This invention relates to a Doppler system for speed and drift measurement. More specifically, the invention relates to such a system that is entirely self contained and is employed on a moving vehicle.

In general, this system employs at least two separate radio beams radiated toward the earth and secures from them two radio echoes having in general frequencies different from the transmitted frequency because of Doppler effect and different from each other if not aligned transversely to the track. From these signals the so-called Doppler-frequency voltages are derived. By addition of signals representing these voltages a signal representing vehicle speed is secured, and by subtraction there is secured a signal representing the geometric relation of the radio beams to the ground track of the vehicle. A control circuit is energized by this subtraction signal to orient the radiators symmetrically with the ground track so that by measurement of the divergence of their position from the vehicular heading direction the drift angle is secured.

The purpose then of this invention is to provide an instrument for measurement of the speed and drift of a vehicle relative to the earth, this instrument including radio components for producing two or more beams of radio energy and for receiving earth echoes of such beams. The instrument combines signals representing two or more of these echoes, the sum or averaged combination representing the vehicular speed and the difference representing the beam and ground track geometrical relation.

A further purpose of this invention is to employ the difference signal to orient the radiators symmetrically relative to the ground track, whereby the drift angle can be measured.

Further understanding of this invention may be secured from the detailed description and drawing, in which.

Figure 1:
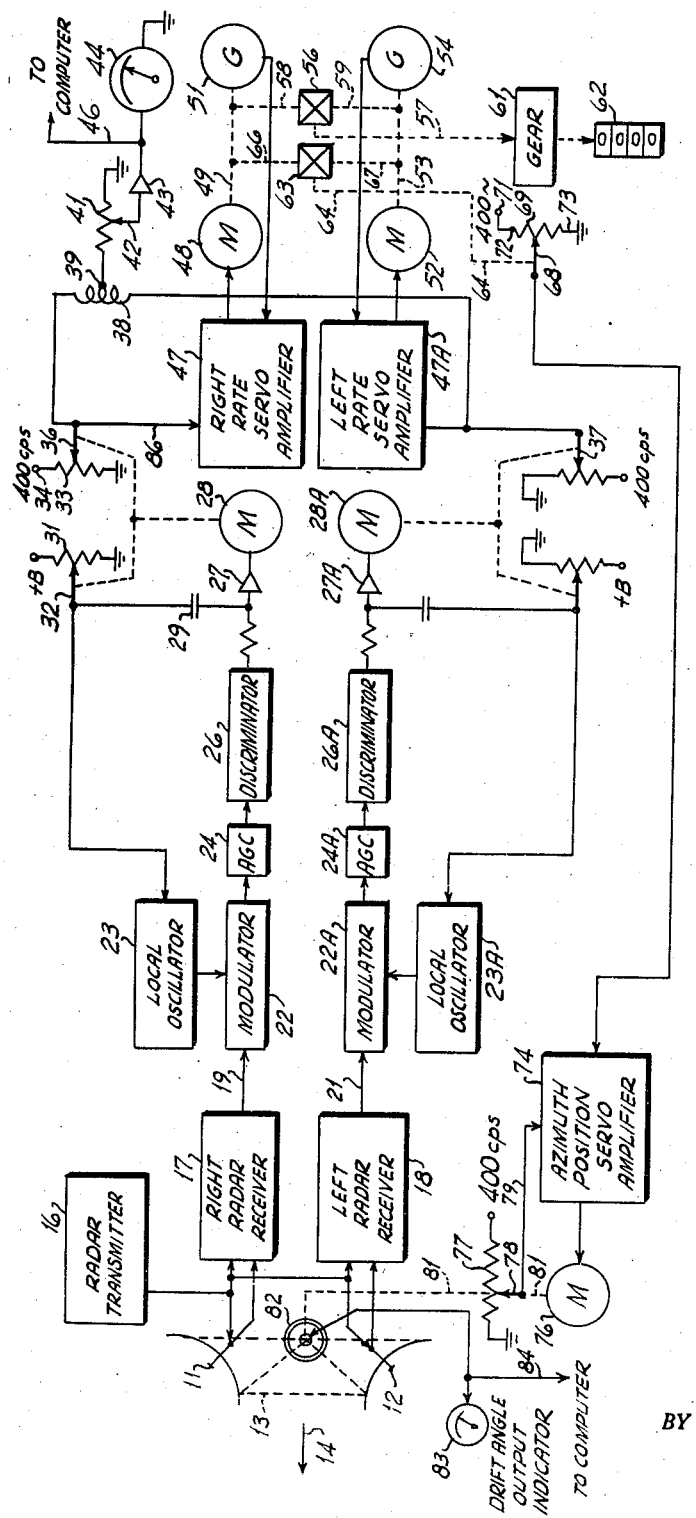
Figure 1 is a schematic representation of an embodiment of the invention.

Referring now to Figure 1, the essential components of the system are indicated generally as being used on an airplane. The system includes radio and computing components, the radio components employing frequencies in the radar range, such as X-band microwave frequencies, and including several antennas arranged to radiate toward the earth so that components of their directions will be in the horizontal direction of the ground track and in the horizontal direction transverse to the ground track. Either the Janus type of operation in which a Doppler beat frequency is secured by combining two echoes, one received from a generally forward and the other from a generally rearward direction, or the coherent oscillator type, in which an echo is combined with the output of a standard oscillator to secure a Doppler frequency, or any other system productive of Doppler outputs may be employed.

The two antennas 11 and 12 are indicated as dipoles with dish reflectors but may be of any directive type. These antennas are fixed in a rigid but rotatable frame 13 so as to direct their beams on either side of the horizontal ground track direction indicated by the arrow 14. They also are pointed downward and forward so that their beams strike the earth. The same antennas are employed for reception of the echoes of their respective beams.

The radio equipment includes, besides the antennas, a microwave pulsed radar transmitter 16, and right and left channel receivers 17 and 18 associated respectively with the right antenna 11 and the left antenna 12. These receivers include microwave guide conductors, duplexing equipment, a coherent oscillator, mixers, amplifiers, and demodulators to produce at the outputs 19 and 21 alternating current voltages having frequencies in the audio range. These frequencies respectively represent the right and left Doppler frequencies, and together contain both speed and drift information.

Specific systems meeting the radio requirements of this invention are described in patent applications Serial No. 749,184, filed May 20, 1947, by William J. Tull et al.; Serial No. 49,926, filed September 18, 1948, by France B. Berger et al.; and Serial No. 410,882, filed February 17, 1954, by John W. Gray et al., and hence further elaboration is unwarranted.

The Doppler frequency signals produced at conductors 19 and 21 are applied to right and left frequency trackers. These devices are similar and have as their function the production of a signal whose magnitude is representative of the median Doppler frequency. The frequency trackers also lock to the Doppler energy input so that during changes in input frequency the median frequency of the Doppler spectrum is accurately followed. Each frequency tracker includes as principal components a modulator 22 and 22A, an oscillator 23 and 23A, an automatic gain control amplifier 24 and 24A, a discriminator 26 and 26A, and an integrating amplifier 27 and 27A. Since both channels are identical in design and operation only the operation of the right channel will be described.

The audio frequency signals having a range of 1,000 to 16,000 cycles per second are applied through conductor 19 to the modulator 22. These signals in general are contained in a pulsed spectrum having a width of about ten percent of its center frequency, and the spectrum frequency may change within its range in either direction at any time.

The modulator 22 has impressed thereon the output of the radar receiver and the output of its associated local oscillator 23, producing therefrom a mixed output signal having a frequency equal to the difference of the oscillator and input Doppler frequencies.

The oscillator 23 is of the multivibrator type producing a rectangular output voltage waveform, and is adjustable in frequency of output between 21 and 36 kilocycles per second linearly proportional to the magnitude of a direct current control potential applied thereto. In the automatic operation of the frequency tracker this oscillator is maintained in such adjustment that the difference between its output frequency and the input signal spectrum median frequency is always nominally 20 kc. p. s.

The output energy of modulator 22 is applied to the amplifier 24 having automatic gain control. The amplified output of amplifier 24 is applied to a discriminator 26 composed of two parallel channels, one tuned by a sharply discriminating filter to a selected frequency below that of the nominal frequency of 20 kc. p. s., and the other tuned to a selected frequency above the nominal frequency of 20 kc. p. s. The output amplitudes are subtracted to provide a direct current voltage representing by its departure from a normal level the divergence of the discriminator input from an exact 20 kc. p. s. frequency.

The output voltage of the discriminator 26 is applied to an integrating amplifier 27. This amplifier, in conjunction with a motor 28, capacitor 29 and voltage divider 31 integrates the discriminator output to produce a direct current potential at slider 32 representing by its magnitude the Doppler frequency. This potential is applied to control the frequency of local oscillator 23, the sense of control being such as to make the oscillator frequency follow the input signal median frequency by a spaced frequency difference, however the signal median frequency may fluctuate.

Thus the frequency tracker is made to follow fluctuations in the frequency of its input signals and to reproduce them as direct current voltage fluctuations the integrated values of which accurately represent the input frequency values. A frequency tracker of this character constitutes the subject matter of the copending application Serial No. 314,306, filed October 11, 1952, of John W. Gray et al., and hence further and detailed description is unnecessary.

Motor 28 operates a second voltage divider 33 which is energized by a 400 C. P. S. source represented by terminal 34. The operation of this voltage divider together with voltage divider 31 by the same motor 28 is so arranged that the voltages of their sliders 32 and 36 are always linearly proportional, that of the latter thus also representing by its magnitude the Doppler channel frequency. This alternating voltage of voltage divider slider 36 and the similar voltage at slider 37 of the other channel are applied to an averaging device consisting of a center-tapped impedance 38. The center tap 39 is connected to ground through a calibrating voltage divider 41. The potential of slider 42 is amplified in amplifier 43 and is indicated in indicator 44. A tap 46 is available for connection to a computer.

The voltmeter indicator 44 is calibrated in units of airplane ground speed. It is obvious that, when the antennas 11 and 12 are rotated about a vertical axis so that their average horizontal direction of emission and reception is along the ground track, the Doppler frequencies derived from their echo signals will be equal. When the local oscillators 23 and 23A, having tracked these equal frequencies, emit equal frequencies they are controlled by equal voltages. To produce these equal voltages the discriminators 26 and 26A have caused motors 28 and 28A to come to rest at equal shaft positions. Thus the alternating voltages at sliders 36 and 37 are equal to the average voltage applied through divider 41 and amplifier 43 to indicator 44. This indicated voltage represents the value of aircraft speed.

When the antennas are not accurately pointed, the voltages at sliderers 36 and 37 are not equal but their average at junction 39 still represents aircraft speed with but small error. For example, if the antennas are off the ground track by 5° the error in speed indication is less than 0.5%.

The alternating voltage outputs of sliders 36 and 37 are also applied to two rate servoamplifiers 47 and 47A. Servoamplifier 47 is connected to operate a motor 48 which through shaft 49 operates a feedback generator 51, thus constituting a servomechanism rotating the shaft 49 at a rate or speed representing the channel Doppler frequency. The other servoamplifier is similarly connected to a motor 52, shaft 53 and generator 54, the shaft 53 rotating at a speed representing the other channel Doppler frequency.

The speeds of shafts 49 and 53 are added in a differential gear 56, so that the output shaft 57 speed represents the average motor shaft speed and therefore the airplane speed. This is easily accomplished by connecting the output shafts 49 and 53 of motors 48 and 52 to the end gear mechanical terminals 58 and 59 of differential 56, and connecting the differential output shaft 57 to the spider or frame mechanical terminal. Then if the input shaft speeds are termed A and B and the spider shaft speed is termed C, $$A+B=2C$$

or $$\frac{A+B}{2}=C$$

That is, the speed of output shaft 57 is the average of the input shaft speeds. After suitable speed change in a gear 61 the output shaft speed is integrated in a revolution counter 62, the instantaneous indication of which at any time therefore represents distance travelled by the airplane.

The motor shafts 49 and 53 are also connected to another differential gear 63 in such sense as to produce at the output shaft 64 a speed of rotation which is the difference of the speeds of rotation of shafts 49 and 53. This is accomplished by connecting the shafts 49 and 53 to the end gear mechanical input terminals 66 and 67 of differential 63, their relative senses being opposite, so that the spider output depends on the difference of the input speeds. That is, if D and E are input speeds, $$\frac{D-E}{2}=F$$

in which F is the output shaft speed. Since integration of this equation proves that the same relation holds for angular displacements, the output angular displacement is one-half of the difference of the input angular shaft displacements, and represents the angle by which the average antenna direction departs from the ground track horizontal direction.

The shaft 64 is connected to the slider 68 of a voltage divider 69 energized by a source 71 of 400 C. P. S. potential at its terminals 72 and 73, in which the output mechanical deflection is converted into a proportional electrical potential. The slider 68 is connected to an azimuth position servomechanism consisting of amplifier 74, motor 76, and voltage divider 77. The position of slider 78 then represents the position of slider 68. The slider 78 is connected to the amplifier 74 through conductor 79 to secure servomechanism feedback operation.

Shaft 81 of motor 76 is also connected to rotate the antenna frame 13 about its vertical axis 82, the sense of rotation relative to the error signal being such as to tend to reduce the error or difference signal magnitude at shaft 64. Thus the entire loop including radio and computing components constitutes a mechanism for maintaining the antennas with their average horizontal component of beam direction accurately pointed along the airplane horizontal ground track direction.

When wind having a component transverse to the ground track exerts force on the airplane, the airplane heading and ground track horizontal components differ by an angle termed the drift angle. This angle is taken off at the pivot 82 of the antennas and is indicated by indicator 83. Conductor 84 is provided for computer connection when required.

Figure 2:
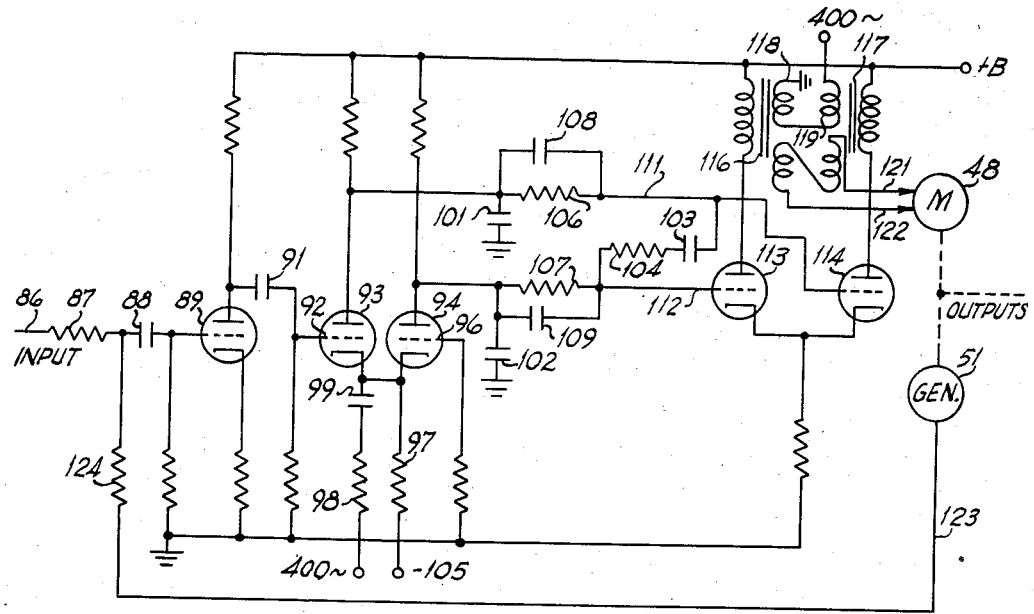
Figure 2 is a schematic diagram of the rate servo-mechanism used in connection with the embodiment of Fig. 1.

The two rate servo controls 47 and 47A are similar and their circuits are shown in Fig. 2, which is specifically the circuit of the right rate servo control 47, its motor 48 and its generator 51, which together form a linear rate servomechanism.

The input signal impressed on the conductor 86, Figs. 1 and 2, consisting of a 400 C. P. S. voltage representing by its magnitude the Doppler frequency in the right channel, is applied through an isolating resistor 87, Fig. 2, and coupling condenser 88 to a triode alternating current amplifier 89. The output is coupled through condenser 91 to one control grid 92 of a balanced stage comprising triodes 93 and 94. The other control grid 96 is grounded and the tubes are coupled through a common cathode resistor 97 to a source of negative potential. Four hundred cycle power is also applied to the cathodes through resistor 98 and condenser 99, and causes such wide excursions of the cathodes as to cut off both tubes except during the most negative part of the cycle. When this part of the cycle occurs the tubes conduct differentially in accordance with whatever signal potential exists at that time on grid 92. The two tubes therefore sense phase as well as amplify. They conduct in pulses which are smoothed to continuous potential by condensers 101, 102, 103 and resistor 104, the sense and magnitude depending on the phase and magnitude of the input signal. This stage is thus phase sensitive and although it has two alternating current inputs, has a direct-current output. The networks including resistors 106 and 107 and condensers 108 and 109 permit rapid transmission of changes in signal magnitude.

The potential between conductors 111 and 112 is applied to a direct-coupled amplifier comprising triodes 113 and 114, which in turn controls a magnetic amplifier comprising saturable transformers 116 and 117. The primary windings 118 and 119 are connected to a source of 400-cycle potential, so that the secondary output at conductors 121 and 122 is 400 C. P. S. alternating potential having sense and magnitude representing that applied to the first tube 89. This output potential is applied to the servo motor 48 driving the 400 C. P. S. tachometer generator 51. A feedback connection 123 is made from the generator 51 through an isolating resistor 124 to the junction of isolating resistor 87 and coupling condenser 88. Polarities are so arranged that the feedback phase through resistor 124 is opposite to that of the signal applied through resistor 87. Therefore when these potentials are equal, they cancel and when unequal the phase applied to triode 89 depends on which is larger. This circuit is therefore highly sensitive and rapidly responsive to changes in signal, and is also linear.

Under some circumstances the output voltages of voltage divider sliders 36 and 37, Fig. 1, are not as suitable for indication of speed as are the output voltages of the feedback tachometers or generators 51 and 54, which voltages are representative of the speeds of shafts 49 and 53, the average of these speeds and of these voltages representing aircraft speed.

Figure 3:
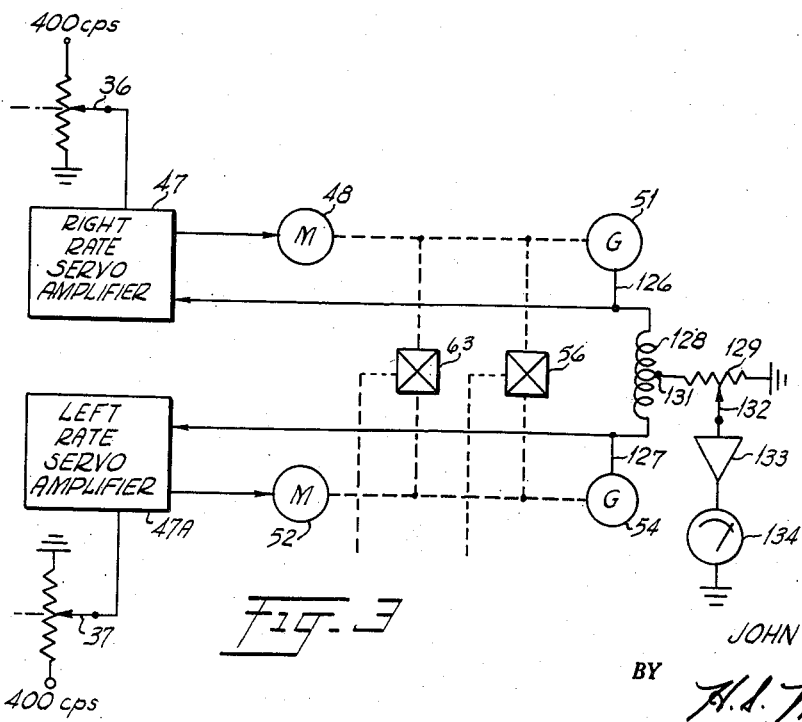
Figure 3 depicts another embodiment of the speed-measuring portion of the system.

The use of these generator outputs for this purpose is depicted in Fig. 3. Voltage divider sliders 36 and 37 are connected to apply their potentials as inputs to rate amplifiers 47 and 47A, which energize motors 48 and 52 as before described. Feedback generators 51 and 54 have their output conductors 126 and 127 connected to the ends of a center-tapped impedance 128. A voltage divider 129 connects the center tap 131 to ground. The voltage divider slider 132 is connected through an amplifier 133 to a voltmeter indicator 134 calibrated in aircraft ground speed units.

The generator output voltages are thus averaged by the impedance 128, and the voltage impressed across voltage divider 129 is the average of the generator outputs. A portion of this average voltage is imposed on slider 132, is amplified by amplifier 133 and is indicated by indicator 134. The adjustment of the slider 132 constitutes a calibration adjustment for the system.

What is claimed is:

1. A Doppler system of the class described comprising, means mounted on a craft for radiating signals toward the earth's surface, means on said craft for receiving signals reflected from the earth's surface in a first direction, means mounted on said craft for receiving signals reflected from the earth's surface in a second direction, said reflected signals being shifted in frequency relative to the frequency of said radiated signals in proportion to the components of velocity of said craft in said respective directions, means for converting the shift in frequency of said first mentioned reflected signal into a first alternating voltage amplitude, means for converting the shift in frequency of said second mentioned reflected signal into a second alternating voltage amplitude, and means responsive to the average amplitude of said first and second alternating voltage amplitudes for indicating aircraft speed.

2. A doppler system of the class described comprising, means mounted on a craft for radiating signals toward the earth's surface, means on said craft for receiving signals reflected from the earth's surface in a first direction, means mounted on said craft for receiving signals reflected from the earth's surface in a second direction, said reflected signals being shifted in frequency relative to the frequency of said radiated signals in proportion to the components of velocity of said craft in said respective directions, means converting the shift in frequency of said first-mentioned reflected signal into a first shaft rotation, the rotational speed of which is proportional to said frequency shift, means for converting said second-mentioned reflected signal into a second shaft rotation, the rotational speed of which is proportional to the frequency shift of the second-mentioned reflected signal, a subtracting differential gear operated by said first and second shaft rotations to produce an output shaft rotation which is the difference of said first and second rotations, means operated by said output shaft for orienting said means for receiving signals reflected in first and second directions of reception relative to the ground track of said vehicle, means operated by said output shaft for indicating a shaft angle representing aircraft drift angle, means converting the shift in frequency of said first-mentioned reflected signal into a first electrical representation, means for converting the shift in frequency of said second-mentioned reflected signal into a second electrical representation, and means responsive to the average of said first and second electrical representations for indicating aircraft speed.

3. A Doppler system in accordance with claim 2 in which said first and second electrical representations are first and second alternating voltage amplitudes.

4. A doppler system of the class described comprising, means mounted on a craft for radiating signals toward the earth's surface, means on said craft for receiving signals reflected from the earth's surface in a first direction, means mounted on said craft for receiving signals reflected from the earth's surface in a second direction, said reflected signals being shifted in frequency relative to the frequency of said radiated signals in proportion to the components of velocity of said craft in said respective direction, means for converting the shift in frequency of said first mentioned reflected signal into a first shaft rotation the speed of which is proportional to said frequency shift, means for converting said second mentioned reflected signal into a second shaft rotation the speed of which is proportional to said frequency shift, a subtracting differential gear operated by said first and second shaft rotations producing as an output a shaft rotation which is the difference of said first and second shaft rotations, and means operated by said output shaft rotation for orienting said means for receiving signals reflected in first and second directions of reception relative to the ground track of said craft.

5. A Doppler system of the class described comprising, a rotatable antenna assembly mounted on a craft, said assembly including a pair of antennas for radiating signals toward the earth's surface and for receiving signals reflected therefrom, said antennas being directed in different directions relative to the ground track of the craft, the respective reflected signals received by said antennas being Doppler shifted in frequency in proportion to the component of velocity of the craft in the respective directions of reception, means for converting the Doppler shift in frequency of the signal received by one of said pair of antennas into a first shaft rotation the speed of rotation of which is proportional to said Doppler shift, means for converting the Doppler shift in frequency of the signal received by the other of said pair of antennas into a second shaft rotation the speed of rotation of which is proportional to said last mentioned Doppler shift, a subtracting differential gear operated by said first and second shaft rotations producing therefrom an output shaft rotation which is the difference of said first and seocnd shaft rotations, a position servo, means for energizing said servo in accordance with the rotation of said output shaft to produce an output shaft angular deflection representing craft drift angle, and means operated by the output of said position servo for rotating said antenna assembly.

6. A Doppler system of the class described comprising, a rotatable antenna assembly mounted on a craft, said assembly including a pair of antennas fixed with respect thereto for radiating signals toward the earth's surface and for receiving signals reflected therefrom, said antennas being directed in different directions relative to the ground track of the craft, the respective reflected signals received by said antennas being Doppler shifted in frequency in proportion to the component of velocity of the craft in the respective directions of reception, means for converting the Doppler shift in frequency of the signal received by one of said pair of antennas into a rotation of a first shaft the speed of rotation of which is proportional to said Doppler shift, means for converting the Doppler shift in frequency of the signal received by the other of said pair of antennas into a rotation of a second shaft the speed of rotation of which is proportional to said last mentioned Doppler shift, a subtracting differential gear operated by said first and second shaft rotations producing therefrom a difference shaft rotation, a position servo, means for energizing said servo in accordance with said difference shaft rotation, means operated by the output of said position servo for rotating said antenna assembly, indicator means, and means energizing said indicator means from said first and second shafts in proportion to the average sum of said first and second shaft rotations.

7. A Doppler system as set forth in claim 6 in which the means for energizing said indicator means includes a summation gear differential operated by said first and second shaft rotations.

8. A Doppler system as set forth in claim 7 including a first voltage generator operated by said first shaft rotation producing a voltage which is proportional to the rotational speed thereof, a second voltage generator operated by said second shaft rotation producing a voltage which is proportional to the rotational speed thereof, means for averaging the voltages generated by said first and second generators, and an indicator energized by said average voltage.

9. A Doppler system of the class described comprising, a rotatable antenna assembly mounted on a craft said antenna assembly including a pair of antennas fixed with respect thereto for radiating signals toward the earth's surface and for receiving signals reflected therefrom, said antennas being directed in different directions relative to the ground track of the craft, a pair of receiving channels each of which is separately energized by a respective one of said pair of antennas; each of said receiving channels including an oscillator the frequency of which is controlled in accordance with the magnitude of a direct current potential imposed thereon, a modulator in each said channel having the respective received signal of the channel and the output of the oscillator impressed thereon and producing a beat frequency signal therefrom, means in each said channel energized by said beat frequency for generating a voltage the magnitude of which is proportional to the departure of said beat frequency from a selected fixed frequency, means in each channel for integrating said voltage to produce said direct current potential the amplitude thereof being proportional to the frequency of the respective received signal, means in each channel for generating an alternating current potential proportional to said respective direct current potential, first and second shafts, means in each of said pair of channels for generating from said respective alternating current potentials rotations of said first and second shafts having speeds proportional to the potential magnitudes, a subtracting differential operated by said shaft rotations producing therefrom a difference rotation, and means for rotating said antenna assembly in accordance with said difference rotation.

10. A Doppler system as set forth in claim 9 including a first voltage generator operated by said first shaft, a second voltage generator operated by said second shaft, means connected to said generators, for averaging the speed magnitudes of said first and second shafts, an indicator energized by said last-named means.

11. A Doppler system of the class described comprising, a rotatable antenna assembly mounted on a craft said antenna assembly including a pair of antennas fixed with respect thereto for radiating signals toward the earth's surface and for receiving signals reflected therefrom, said antennas being directed in different directions relative to the ground track of the craft, a pair of receiving channels each of which is separately energized by a respective one of said pair of antennas; each of said receiving channels including an oscillator the frequency of which is controlled in accordance with the magnitude of a direct current potential imposed thereon, a modulator in each said channel having the respective received signal of the channel and the output of the oscillator impressed thereon and producing a beat frequency signal therefrom, means in each said channel energized by said beat frequency for generating a voltage the magnitude of which is proportional to the departure of said beat frequency from a selected fixed frequency, means in each channel for integrating said voltage to produce said direct current potential the amplitude thereof being proportional to the frequency of the respective received signal, means in each channel for generating an alternating current potential proportional to said respective direct current potential, first and second shafts, means in each of said pair of channels for generating from said respective alternating current potentials rotations of said first and second shafts having speeds proportional to the potential magnitudes, an adding differential operated by said first and second shaft rotations producing therefrom a shaft rotation having the average speed of said shaft rotations, and a revolution counter operated by said adding differential, said revolution counter indication representing elapsed total craft distance travelled.

12. A Doppler system of the class described comprising, a rotatable antenna assembly mounted on a craft said antenna assembly including a pair of antennas fixed with respect thereto for radiating signals toward the earth's surface and for receiving signals reflected therefrom, said antennas being directed in different directions relative to the ground track of the craft, a pair of receiving channels each of which is separately energized by a respective one of said pair of antennas; each of said receiving channels including an oscillator the frequency of which is controlled in accordance with the magnitude of a direct current potential imposed thereon, a modulator in each said channel having the respective received signal of the channel and the output of the oscillator impressed thereon and producing a beat frequency signal therefrom, means in each said channel energized by said beat frequency for generating a voltage the magnitude of which is proportional to the departure of said beat frequency from a selected fixed frequency, means in each channel for integrating said voltage to produce said direct current potential the amplitude thereof being proportional to the frequency of the respective received signal, means in each channel for generating an alternating current potential proportional to said respective direct current potential, passive means for generating from the two alternating current potential outputs of said last-named means an alternating potential representative of the average thereof, and indicating means operated by said alternating potential for indicating its magnitude representative of craft ground speed.

13. A Doppler system of the class described comprising, a rotatable antenna assembly mounted on a craft said antenna assembly including a pair of antennas fixed with respect thereto for radiating signals toward the earth's surface and for receiving signals reflected therefrom, said antennas being directed in different directions relative to the ground track of the craft, a pair of receiving channels each of which is separately energized by a respective one of said pair of antennas, each of said receiving channels including an oscillator the frequency of which is controlled in accordance with the magnitude of a direct current potential imposed thereon, a modulator in each said channel having the respective received signal of the channel and the output of the oscillator impressed thereon and producing a beat frequency signal therefrom, means in each said channel energized by said beat frequency for generating a voltage the magnitude of which is proportional to the departure of said beat frequency from a selected fixed frequency, means in each channel for integrating said voltage to produce said direct current potential the amplitude thereof being proportional to the frequency of the respective received signal, means in each channel for generating an alternating current potential proportional to said respective direct current potential, first and second shafts, means in each of said pair of channels for generating from said respective alternating current potentials rotations of said first and second shafts having speeds proportional to the potential magnitudes, a subtracting differential operated by said shaft rotations producing therefrom a difference rotation, means for rotating said antenna assembly in drift angle in accordance with said difference rotation, passive means for generating from said alternating current potentials proportional to said respective direct current potentials an alternating potential representative of the average thereof, and indicating means operated by said alternating potential for indicating its magnitude representative of craft ground speed.

14. A Doppler system of the class described comprising, means mounted on a craft for radiating signals toward the earth's surface, means on said craft for receiving signals reflected from the earth's surface in a first direction, means mounted on said craft for receiving signals reflected from the earth's surface in a second direction, said reflected signals being shifted in frequency relative to the frequency of said radiated signals in proportion to the components of velocity of said craft in said respective directions, means for converting the shift in frequency of said first mentioned reflected signal into a shaft rotation the speed of which is proportional to said frequency shift, means for converting the shift in frequency of said second mentioned reflected signal into a shaft rotation the speed of which is proportional to said frequency shift, and means operative by the average of said first and second mentioned shaft rotations for indicating the speed of said craft.

15. A Doppler system of the class described comprising, means mounted on a craft for radiating signals toward the earth's surface, means on said craft for receiving signals reflected from the earth's surface in a first direction, means mounted on said craft for receiving signals reflected from the earth's surface in a second direction, said reflected signals being shifted in frequency relative to the frequency of said radiated signals in proportion to the components of velocity of said craft in said respective directions, means converting the shift in frequency of said first-mentioned reflected signal into a first shaft rotation, the rotational speed of which is proportional to said frequency shift, means for converting said second-mentioned reflected signal into a second shaft rotation, the rotational speed of which is proportional to the frequency shift of the second-mentioned reflected signal, a subtracting differential gear operated by said first and second shaft rotations to produce an output shaft rotation which is the difference of said first and second rotations, means operated by said output shaft for orienting said means for receiving signals reflected in first and second directions of reception relative to the ground track of said vehicle, a craft ground speed indicator, and means averaging the speeds of said first and second shaft rotations to operate said indicator.

References Cited in the file of this patent
UNITED STATES PATENTS

| | | |
|---|---|---|
| 2,193,361 | Rice | Mar. 12, 1940 |
| 2,422,064 | Anderson et al. | June 10, 1947 |
| 2,476,032 | Feldman et al. | July 12, 1949 |